United States Patent
Celestine

Patent Number: 6,016,623
Date of Patent: Jan. 25, 2000

[54] RODENT TRAP

[76] Inventor: Wallace Celestine, 1545 Anse Broussard Hwy., Breaux Bridge, La. 70517

[21] Appl. No.: 09/168,789

[22] Filed: Oct. 8, 1998

[51] Int. Cl.[7] .......................... A01M 23/04; A01M 23/10
[52] U.S. Cl. ........................... 43/61; 43/69; 43/71; 43/74
[58] Field of Search .................................. 43/60, 61, 64, 43/65, 66, 67, 69, 70, 71, 72, 73, 74, 76

[56] References Cited

U.S. PATENT DOCUMENTS

| | | | |
|---|---|---|---|
| 1,317,866 | 10/1919 | Downing | 43/69 |
| 2,110,678 | 3/1938 | Robbins | 43/72 |
| 2,524,423 | 10/1950 | Buford | 43/60 |
| 3,791,065 | 2/1974 | Snow | 43/69 |
| 4,241,531 | 12/1980 | Nelson et al. | 43/69 |
| 4,393,616 | 7/1983 | Kaufman et al. | 43/60 |
| 4,590,704 | 5/1986 | Volk | 43/61 |
| 4,706,406 | 11/1987 | Mowalt et al. | 43/61 |
| 4,890,415 | 1/1990 | Fressola et al. | 43/61 |
| 5,107,619 | 4/1992 | Zapata et al. | 43/81 |
| 5,265,371 | 11/1993 | McCuistion, III et al. | 43/70 |
| 5,305,545 | 4/1994 | Cerullo | 43/72 |
| 5,471,781 | 12/1995 | Vine | 43/69 |
| 5,519,962 | 5/1996 | Cerullo | 43/72 |

*Primary Examiner*—Michael J. Carone
*Assistant Examiner*—James S. Bergin
*Attorney, Agent, or Firm*—Joseph N. Breaux

[57] ABSTRACT

A rodent trap which includes a central housing interior into which a rodent is lured by bait and enters on a rodent entry ramp and inside which is located a rotating trap door that is operated by a high speed DC motor which is actuated by an infrared sensor positioned inside the housing, the motor is engaged to rotate the trap door and timed by a cam switch to return to a closed position and ready to operate for the entry of the next rodent. When the rodent falls through the trap door, it falls into a rodent box which is received by an insertion in the housing lower section and which includes a spring biased sliding cover that automatically slides to an opened position when the box is inserted into the housing and automatically closes when removed from the housing. The rodent box also includes a rodent presence indicator that is actuated by a weight activated switch located on the bottom surface of the rodent box and indicates to the user if a rodent or rodents are in the box.

5 Claims, 4 Drawing Sheets

RODENT TRAP

TECHNICAL FIELD

The present invention relates to devices and methods for rodent traps and more particularly to devices and methods for a rodent trap that includes a housing having a rodent box insertion opening, a pivoting rodent ramp leading up to the interior of the housing and into connection with a rotating trap door, an infrared sensor for detecting when a rodent has entered the housing and positioned on the rotating trap door and a high speed electric motor for rotating the electric trap door to cause the rodent to drop into the rodent box. The rodent box includes a spring biased sliding cover that automatically moves into the open position as the rodent box is slid into the opening of the housing and that automatically closes as the rodent box is removed.

BACKGROUND ART

To built a better mouse trap has always eluded inventors, while numerous useful improvements have been disclosed there has never been a useful rodent trap as the present that provides a means for capturing numerous rodents in the same trap and which is self monitoring and simple to operate. Some of the prior art patents regarding rodent traps are as follows: Zapata et al, U.S. Pat. No. 5,107,619; Fressola et al, U.S. Pat. No. 4,890,415; Mowatt et al, U.S. Pat. No. 4,706,406 ; Kaufman et al, U.S. Pat. No. 4,393,616; Volk, U.S. Pat. No. 4,590,704; and Buford U.S. Pat. No. 2,524,423. As can be seen from the prior art there have numerous device disclosed which incorporate electrical and various mechanical arrangements in an attempt to build a trap that functions efficiently and easily.

The present invention accomplishes these and other goals by providing a rodent trap that includes a central housing into which a rodent enters on a rodent entry ramp and inside which is a rotating trap door that is operated by a high speed DC motor and which is actuated by an infrared sensor positioned inside the housing, the motor is engaged to rotate the trap door and timed by a cam switch to return to a closed position and ready to operate upon entry of the next rodent. When the rodent falls through the trap door, it falls into a rodent box which box is received by an insertion in the housing lower section and which box includes a spring biased sliding cover that automatically slides to an opened position when the box is inserted into the housing and automatically closes when removed from the housing. The rodent box also includes a rodent presence indicator that is actuated by a weight activated switch located on the bottom surface of the rodent box and indicates to the use if a rodent or rodents are in the box.

GENERAL SUMMARY DISCUSSION OF INVENTION

It is thus an object of the invention to provide a rodent trap that will capture numerous rodents before needing to be emptied by a user.

It is a further object of the invention to provide a rodent trap that includes a trap door operated by a high speed DC motor which is actuated by an infrared sensor and which is located within a housing wherein a rodent ramp allows a rodent to enter the housing interior and, by its presence in the housing, the infrared sensor actuates the DC motor thereby operating the trap door and causing the rodent to fall into a rodent box while the trap door returns to a closed position and ready to be actuated by the entry of another rodent.

It is a still further object of the invention to provide a rodent trap that comprises a rodent box that includes a spring biased sliding cover that is biased to remain closed and which is urged to an open position when slid into an insertion in a lower housing portion of a rodent trap below a trap door assembly and wherein the opened sliding door is in communication with the trap door so that when a rodent falls through the trap door it falls into the open rodent box and when the rodent box is removed from the lower housing portion of the rodent trap the sliding door automatically closes as it is withdrawn from the insertion thereby allowing the user to remove the rodent box and dispose of the rodent(s) captured therein.

It is a still further object of the invention to provide a rodent trap that includes a housing portion with a rodent bait located therein to lure rodents in the trap interior and over a trap door so that the rodents fall through the trap door when it is rotated by operation of a high speed DC motor and which is activated by an infrared sensor.

Accordingly, a rodent trap is provided which includes a central housing into which a rodent is lured by bait and enters on a rodent entry ramp and inside which is located a rotating trap door that is operated by a high speed DC motor that is actuated by an infrared sensor positioned inside the housing, the motor is engaged to rotate the trap door and timed by a cam switch to return to closed position and ready to operate for the entry of the next rodent. When the rodent falls through the trap door, it falls into a rodent box which is received by an insertion in the housing lower section and which includes a spring biased sliding cover that automatically slides to an opened position when the box is inserted into the housing and automatically closes when removed from the housing. The rodent box also includes a rodent presence indicator that is actuated by a weight activated switch located on the bottom surface of the rodent box and indicates to the user if a rodent or rodents are in the box.

BRIEF DESCRIPTION OF DRAWINGS

For a further understanding of the nature and objects of the present invention, reference should be had to the following detailed description, taken in conjunction with the accompanying drawings, in which like elements are given the same or analogous reference numbers and wherein.

EXEMPLARY MODE FOR CARRYING OUT THE INVENTION

It can be seen from the following description that the rodent trap is that of an electrically operated automated trap for rodents such as rats or mice. The trap features a DC motor driven trap door that is activated by an infrared sensor. The infrared sensor is located so that when a rodent enters the trap the trap door is rapidly rotated to an open position and rapidly to a closed position. The trap includes an entry ramp which allows the rodents to easily walk into the trap. A removable rodent box is positioned below the trap door and has a open top that is covered by a segmented cover that travels in opposing guides in the rodent box frame. The cover is biased to springingly remain in a closed position and is urged to an opened position when inserted into an insertion opening below the housing interior. The trap door operation motor and cam switch are designed to rapidly operate the trap door and return the trap door to a closed and ready position after the trap door has operated, thereby allowing numerous rodents to be captured without having to service or empty the trap.

Figure 1:
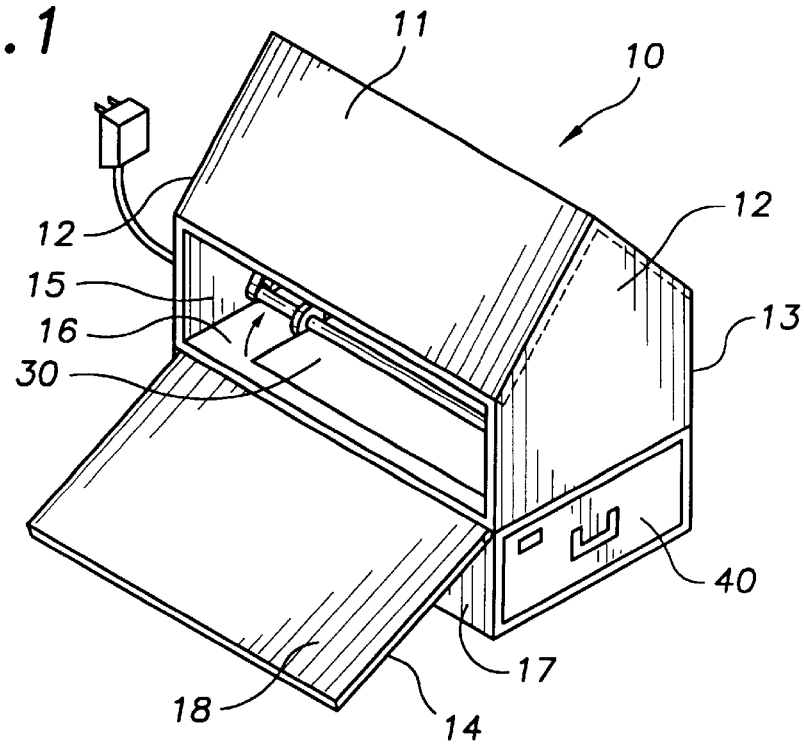
FIG. 1 is an isometric view of the rodent trap illustrating the pivoting rodent ramp in an open position and further illustrating the interior of the trap housing.
Figure 2:
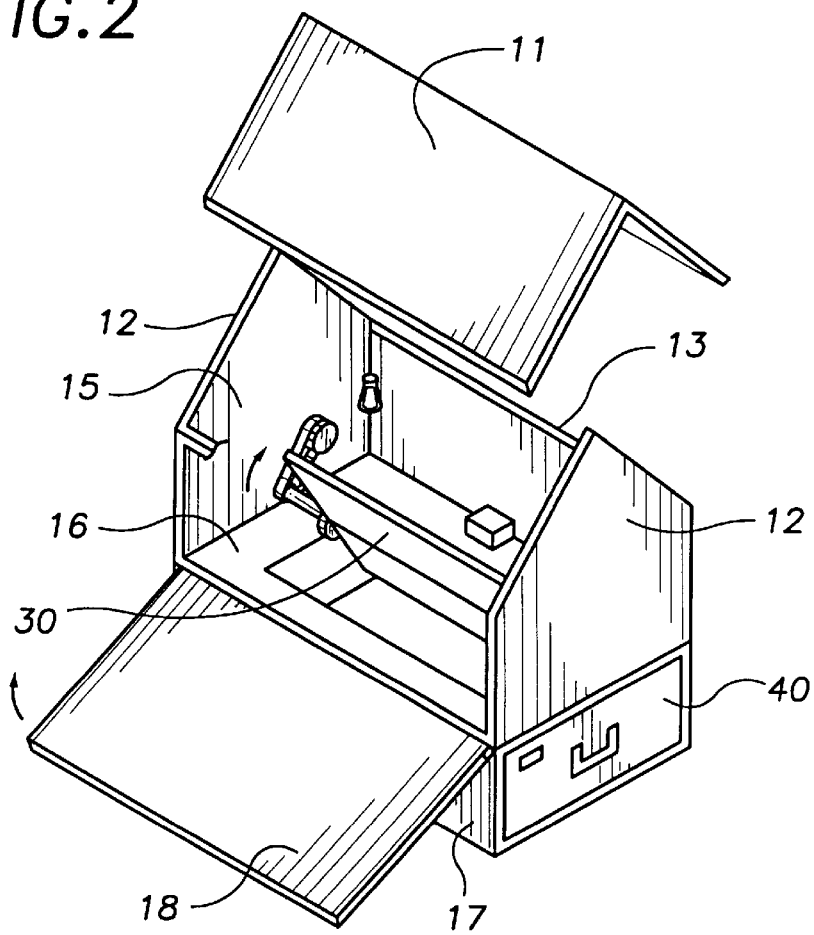
FIG. 2 is an isometric view of the rodent trap with the top of the housing removed thereby illustrating the interior of the housing and indicating the movement of the trap door while in motion.

Referring to the figures in detail, FIG. 1 illustrates the rodent trap 10 generally, which includes a housing comprising a removable roof 11, permanent left and right side walls 12, a back wall 13, and a swinging front wall 14 which also serves as a rodent entry ramp for rodents to easily walk into the interior 15 of the housing. The floor of the housing 16 has a trap door 30 centrally positioned thereon. A lower section of the housing includes an extension 17 for receiving a rodent box 40. The entire housing is preferably constructed of injected molded ABS plastic or any other suitable polymer. The ramp 14 preferably includes a friction surface 18 so that a rodent can easily walk into the trap without becoming discouraged and further includes a hinge 19 which allows the ramp to be either opened when the trap is in use of closed when the trap is not in use. The interior of the housing may also include a rodent bait box 80 which is positioned to lure a rodent into the trap and on top of the trap door 30.

Figure 3:
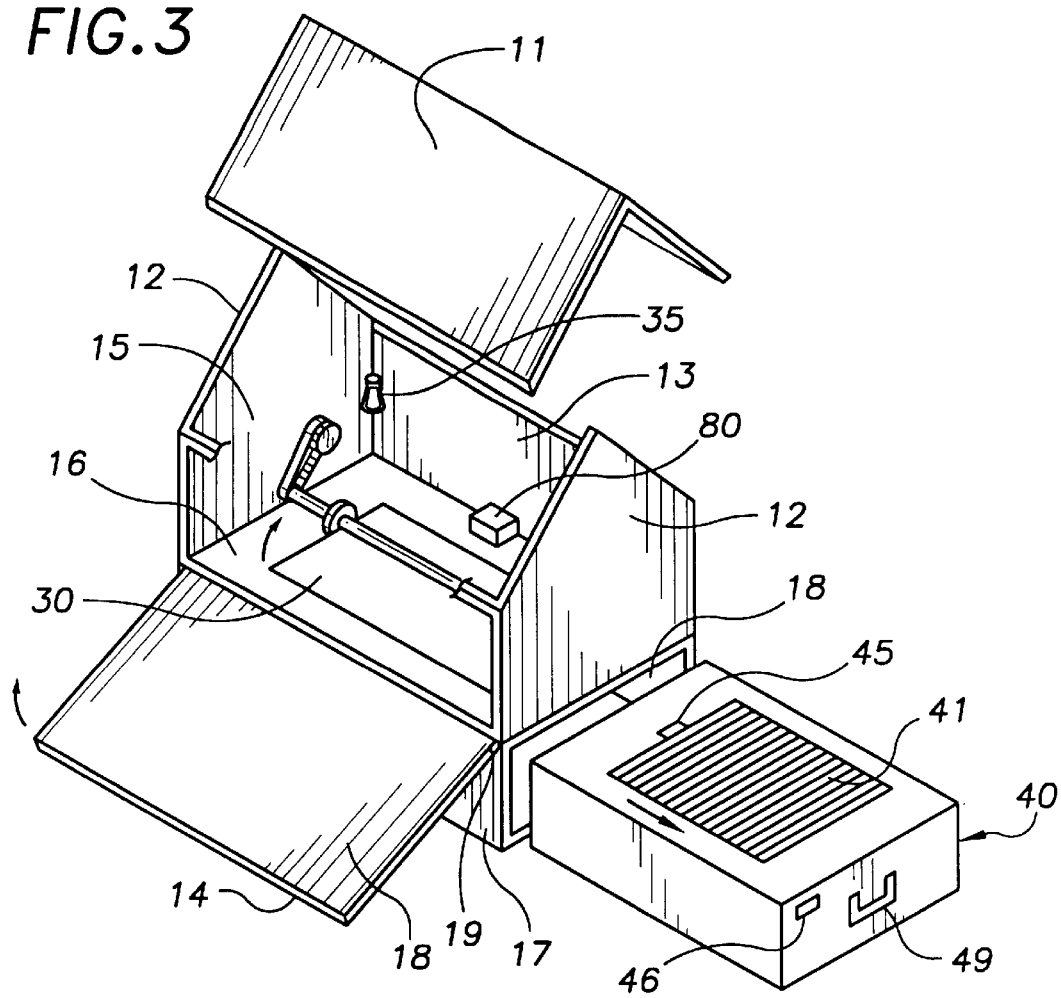
FIG. 3 is an isometric view of the rodent trap with the top removed thereby illustrating the interior of the housing and indicating the positioning of the trap door in the ready position, while the rodent box is shown removed from the insertion with its sliding cover automatically moved to a closed position.
Figure 4:
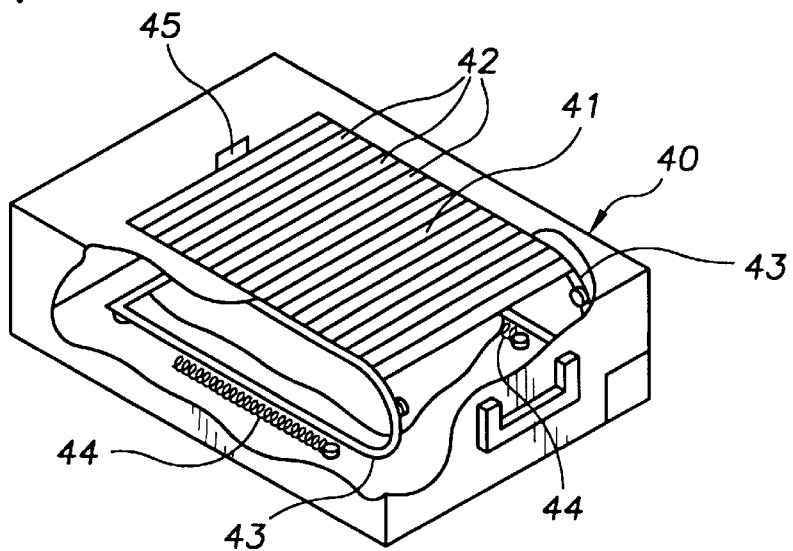
FIG. 4 is an isometric and cut away view of the rodent box illustrating the internal mechanism of the sliding cover with the segmented cover slidingly contained with the tracks and springingly urged to a closed position.
Figure 5:
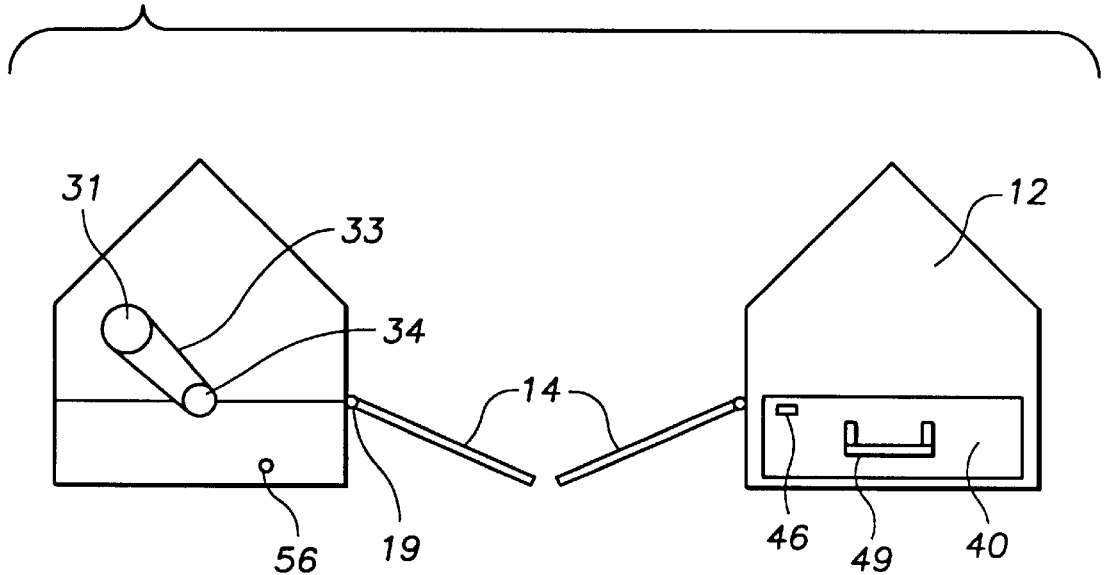
FIG. 5 are side views of the rodent trap illustrating the drive mechanism for the trap door and the handle for the rodent box.
Figure 8:
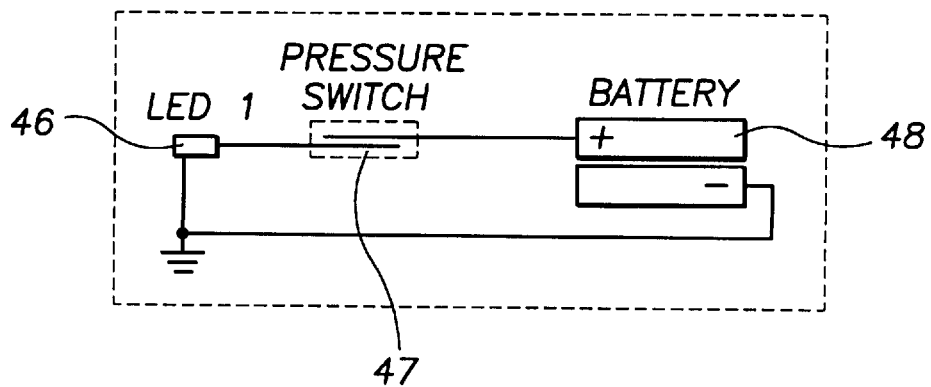
FIG. 8 is an electrical schematic of the rodent box presence indicator light and pressure switch.

FIG. 3 illustrates the rodent box 40 removed from the insertion opening 18 on a lower portion of the housing while FIG. 4 illustrates the rodent box in greater detail. The rodent box 40 includes a top sliding cover 41 which comprises numerous segments 42 which slide in opposed guides 43 mounted in the interior of the box. The numerous segments 42 are flexingly joined so that they all move in unison in the guides 43 and are further biased to move to a closed position by a pair of springs 44. The sliding cover 41 is urged to an open position when the rodent box is inserted into the insertion opening 18 and an extending tab 45 attached to the last segment catches on the inside upper surface of the insertion and causes the cover to slidingly open. The opening in the rodent box is aligned with the opening in the trap door when the rodent box is fully inserted into the insertion. The rodent box allows the user to remove the box from the trap and empty the rodent from the box in a remote location if desired. The rodent box also includes a handle 49 for easily handling the box. The rodent box also includes a rodent presence indicator light 46 which is activated by a pressure switch 47 located on a floor surface of the rodent box. The rodent presence indicator light is powered by a battery 48. The electrical diagram for the rodent presence light is illustrated in FIG. 8.

Figure 6:
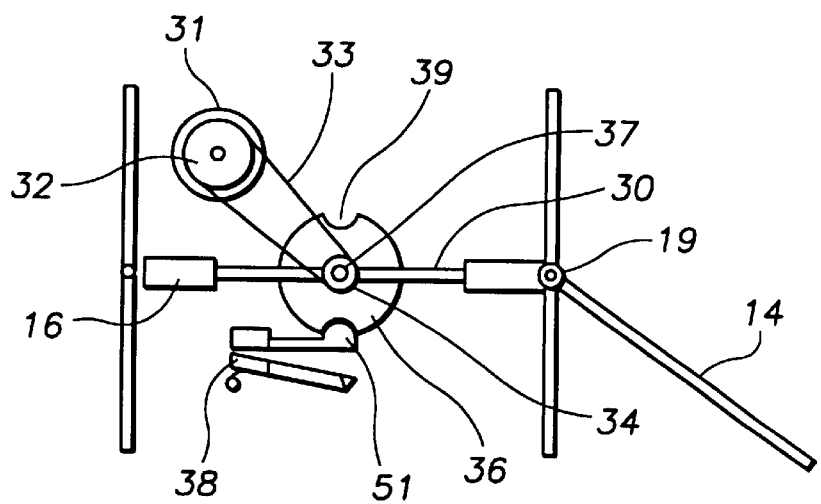
FIG. 6 is an isolated view of the trap door drive mechanism and cam switch.
Figure 7:
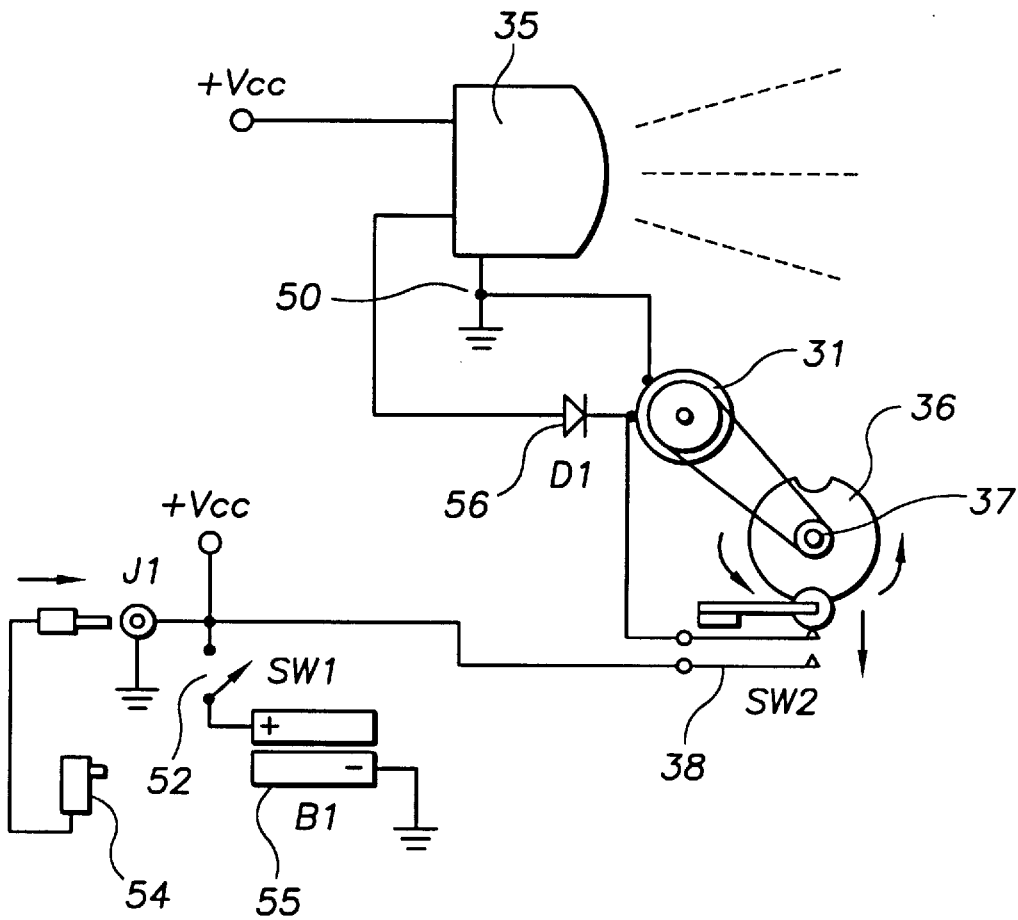
FIG. 7 is a schematic diagram of the electrical wiring for the trap door drive mechanism and infrared sensor.

The trap door 30 includes a drive mechanism comprising a DC motor 31, motor drive pulley 32, drive belt 33, trap door drive pulley 34, trap door shaft 37, infrared sensor 35, indexing cam 36, indexing cam power switch 38, a power supply 50, interlock switch 56 and power switch 52. FIGS. 6 and 7 illustrate the placement and interrelationship of the various components. The trap door 30 is driven by the DC motor 31 via the drive belt 33, while the drive motor pulley 32 is substantially larger than the trap door pulley 34 and preferably is geared so that the trap door would rotate four rotations for each motor shaft rotation, this assures extremely rapid trap door movement which is essentially to assure the rodents fall into and do not escape the trap. Power to the motor may be either an internally rechargeable battery 55 or an external power supply via the power jack 54. The interlock switch 56 is located on an interior of the lower section of the housing and is in a closed position when the rodent box is fully inserted into the insertion 18. When the interlock switch 56 and the power switch are both closed then en electromechanical/power connection exist between the trap door, infrared sensor, the indexing cam, the motor and the indexing cam power switch. This assembly provides for a positive accurate rotation and positioning of the trap door by working in the following sequence. When the electrical system is in the "power on" mode the infrared sensor will activate whenever a rodent enters the interior of the trap. This condition provides a short burst of electrical power to the DC motor turning the trap door via the pulley belt arrangement. The trap door shaft is connected to a trap door pulley with an indexing cam positioned thereon. The indexing cam has two semicircular indentions 39 that provide a positive seat for the associated spring loaded indexing wheel 51. The indexing wheel is positioned so that the trap door will always stay fixed in a position that is parallel or flat with the non rotating portion 16 of the housing floor. The indexing cam power switch 38 includes a leaf switch type switch located below the indexing cam and is in a closed position, providing power to the drive motor, when the indexing wheel is not seated in a semicircular indention 39.

The operation sequence of the trap door begins when a rodent walks up the ramp and into the interior of the trap, the infrared sensor sends a pulse of electrical power to the motor thereby turning the motor, trap door and indexing cam. As the indexing cam turns the spring loaded indexing wheel lifts out of the indention thereby closing the indexing switch and providing power to the motor. The motor and indexing cam continue to turn until the next indention on the indexing cam encounter the indexing wheel thereby opening the indexing switch and turning off power to the motor. The unit is now reset and ready for another rodent to enter the housing.

It is noted that the embodiment of the Rodent Trap described herein in detail for exemplary purposes is of course subject to many different variations in structure, design, application and methodology. Because many varying and different embodiments may be made within the scope of the inventive concept(s) herein taught, and because many modifications may be made in the embodiment herein detailed in accordance with the descriptive requirements of the law, it is to be understood that the details herein are to be interpreted as illustrative and not in a limiting sense.

What is claimed is:

1. A rodent trap comprising:

a) a housing with integral walls and a removable roof forming an interior area within the housing and wherein a trap door assembly is positioned on a bottom surface of the housing, b) a swinging rodent ramp forming a wall of the housing when closed and further providing a ramp for a rodent to enter the interior of the housing when the ramp is swung open, c) a rodent box insertable into an insertion opening below the bottom surface of the housing wherein said box includes a sliding cover which is biased by a spring to remain in a closed position when the box is removed from the insertion opening in the housing and which sliding cover is urged to an open position when the box is inserted into the housing insertion opening, a rodent box opening is in alignment with the trap door on the bottom surface of the housing when the box is inserted into the housing insertion opening, d) the trap door assembly further comprises a means for operating the trap door which includes an infrared sensor, a motor, a power supply, and a cam switch, wherein the infrared sensor detects when a rodent has entered the interior of the housing which then allows power from the power supply to energize the motor which is engaged to the trap door and rotate the trap door to allow the rodent to fall into the rodent box while the trap door continues to rotate to a closed position wherein the cam switch disconnects the power to the motor.

2. The rodent trap of claim 1, wherein the rodent box further comprises, a rodent presence circuit which includes a pressure switch located on an interior floor of the rodent box, a power supply and a indicator light which is powered when a rodent depresses the pressure switch thereby alerting a user of a need to empty the rodent box.

3. The rodent trap of claim 1, wherein the housing interior further comprises a rodent bait lure container located in the interior of the housing and positioned so that a rodent will step on the trap door when lured to the bait container.

4. The rodent trap of claim 1 wherein the rodent box further comprises a sliding cover constructed of numerous segments that are contained within two opposed cover guides and which numerous segments move in unison in the guides when urged by said spring to a position which closes said opening in the rodent box and which segments move in unison to a position which opens said opening in the rodent box when the box is inserted into the insertion opening of the housing.

5. The rodent trap of claim 1 wherein said motor further comprises a direct current motor which is gearingly engaged with the trap door so the trap door rotates four revolutions for each revolution of the motor thereby providing a high speed trap door.

* * * * *